(12) United States Patent
Loui

(10) Patent No.: US 7,366,994 B2
(45) Date of Patent: *Apr. 29, 2008

(54) USING DIGITAL OBJECTS ORGANIZED ACCORDING TO HISTOGRAM TIMELINE

(75) Inventor: Alexander C. Loui, Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 115 days.

This patent is subject to a terminal disclaimer.

(21) Appl. No.: 11/248,560

(22) Filed: Oct. 12, 2005

(65) Prior Publication Data

US 2006/0036960 A1      Feb. 16, 2006

Related U.S. Application Data

(63) Continuation of application No. 09/863,856, filed on May 23, 2001, now Pat. No. 6,996,782.

(51) Int. Cl.
*G06F 13/00* (2006.01)
*T06F 15/00* (2006.01)

(52) U.S. Cl. ...................... 715/764; 715/838

(58) Field of Classification Search ................ 715/764, 715/776, 723, 838, 840, 835, 804
See application file for complete search history.

(56) References Cited

U.S. PATENT DOCUMENTS

| | | |
|---|---|---|
| 4,567,610 A | 1/1986 | McConnell |
| 5,083,860 A | 1/1992 | Miyatake et al. |
| 5,164,831 A | 11/1992 | Kuchta et al. |
| 5,493,677 A | 2/1996 | Balogh et al. |
| 5,539,841 A | 7/1996 | Huttenlocher et al. |
| 5,576,759 A | 11/1996 | Kawamura et al. |
| 5,594,807 A | 1/1997 | Liu |
| 5,598,557 A | 1/1997 | Doner et al. |
| 5,719,643 A | 2/1998 | Nakajima |
| 5,751,378 A | 5/1998 | Chen et al. |
| 5,805,746 A | 9/1998 | Miyatake et al. |

(Continued)

FOREIGN PATENT DOCUMENTS

WO      WO 2004/049206      6/2004

OTHER PUBLICATIONS

John E. Freund et al., "Dictionary/Outline of Basic Statistics", 1991, pp. 49-50, Dover Publications, Inc.

(Continued)

*Primary Examiner*—Cao (Kevin) Nguyen

(57) ABSTRACT

A method for organizing visual digital objects into a histogram timeline having a first axis with a timeline representing a range of time organized into separate time periods and a second axis orthogonal to the timeline axis representing a number of digital multimedia objects corresponding to portions of the histogram timeline. Each time period is associated with a graphical metaphor extending from the first axis in a direction along the second axis to an extent that indicates a relative number of visual digital objects associated with the time periods. Each said graphical metaphor comprises event icons which group the visual digital objects associated with the selected time period according to events. The icons are proportionately sized to indicate the number of visual digital objects in the group relative to the total number of visual digital objects associated with the selected time period.

18 Claims, 17 Drawing Sheets

U.S. PATENT DOCUMENTS

| | | |
|---|---|---|
| 5,809,161 A | 9/1998 | Auty et al. |
| 5,809,202 A | 9/1998 | Gotoh et al. |
| 5,842,194 A | 11/1998 | Arbuckle |
| 5,872,859 A | 2/1999 | Gur et al. |
| 5,982,369 A | 11/1999 | Sciammarella et al. |
| 6,012,091 A | 1/2000 | Boyce |
| 6,021,231 A | 2/2000 | Miyatake et al. |
| 6,097,389 A | 8/2000 | Morris et al. |
| 6,204,840 B1 * | 3/2001 | Petelycky et al. ....... 715/500.1 |
| 6,301,586 B1 * | 10/2001 | Yang et al. .............. 707/104.1 |
| 6,311,189 B1 | 10/2001 | deVries et al. |
| 6,335,742 B1 | 1/2002 | Takemoto |
| 6,351,556 B1 | 2/2002 | Loui et al. |
| 6,396,963 B2 | 5/2002 | Shaffer et al. |
| 6,408,301 B1 | 6/2002 | Patton et al. |
| 6,486,896 B1 | 11/2002 | Ubillos |
| 6,545,660 B1 | 4/2003 | Shen et al. |
| 6,564,209 B1 | 5/2003 | Dempski et al. |
| 6,567,980 B1 | 5/2003 | Jain et al. |
| 6,606,411 B1 | 8/2003 | Loui et al. |
| 6,784,925 B1 | 8/2004 | Tomat et al. |
| 6,865,297 B2 | 3/2005 | Loui et al. |
| 2002/0075322 A1 | 6/2002 | Rosenzweig et al. |

OTHER PUBLICATIONS

Merriam-Webster Inc., "Webster's Ninth New Collegiate Dictionary", 1990, pp. 573.

Bhavan Gandhi et al., "Intelligent Multimedia Content Management on Mobile Devices", 0-7803-8603-5/04, 2004 IEEE.

* cited by examiner

# USING DIGITAL OBJECTS ORGANIZED ACCORDING TO HISTOGRAM TIMELINE

CROSS REFERENCE TO RELATED APPLICATIONS

This is a continuation of U.S. application Ser. No. 09/863,856, filed May 23, 2001 now U.S. Pat. No. 6,996,782, entitled "Using Digital Objects Organized According To A Histogram Timeline", by Martin A. Parker, et al.

Reference is made to commonly assigned U.S. patent application Ser. No. 09/742,028, now U.S. Pat. No. 6,950,989, filed Dec. 20, 2000, entitled "Timeline-Based Graphical User Interface for Efficient Image Database Browsing and Retrieval" by Elizabeth Rosenzweig et al.; Ser. No. 09/163,618, now U.S. Pat. No. 6,606,411, filed Sep. 30, 1998, entitled "A Method for Automatically Classifying Images Into Events" by Alexander C. Loui et al.; and Ser. No. 09/197,363, now U.S. Pat. No. 6,351,556 filed Nov. 20, 1998, entitled "A Method for Automatically Comparing Content of Images for Classification Into Events" by Alexander C. Loui et al., the disclosures of which are incorporated herein by reference.

FIELD OF THE INVENTION

The present invention relates to an effective method of organizing digital objects and for facilitating the display or processing of desired objects.

BACKGROUND OF THE INVENTION

Digital imaging devices are being used with increasing frequency to record digital still images and digital audio/video sequences. Digital multimedia content from other sources is also proliferating, such as digitized consumer snapshots, digitized home video, digitally scanned graphics, digitized music, and other audio recording. With the potential for vast numbers of such multimedia objects to be generated and stored by individuals, the problem of representing a collection of such objects to a user for retrieval and organization becomes important. Typically, a digital camera user takes a plurality of digital images or audio/video sequences that are stored on a removable memory card. These multimedia objects can be transferred from the memory card and stored, for example, on a hard drive or other non-volatile memory associated with the user's computer. Alternatively, digital multimedia objects can be transferred over the Internet to a web site for storage, sharing, printing, and other purposes.

Over time, a user can collect hundreds, or perhaps thousands, of multimedia objects, which are records of events at various points in time. As the number of such objects in a particular database grows, traditional methods of displaying them to a user such as in hierarchical file structures or simple "contact sheets" of image thumbnails become ineffective.

SUMMARY OF THE INVENTION

It is an object of the present invention to permit a user to facilitate access to desired digital objects from a database.

It is another object of the present invention to provide an effective method for organizing representations of digital multimedia objects to facilitate the selection of desired digital multimedia objects.

These and other objects useful in the solution of this problem are achieved by a method for organizing visual digital objects into a histogram timeline having a first axis with a timeline representing a range of time organized into separate time periods and a second axis orthogonal to the timeline axis representing a number of digital multimedia objects corresponding to portions of the histogram timeline. Each time period is associated with a graphical metaphor extending from the first axis in a direction along the second axis to an extent that indicates a relative number of visual digital objects associated with the time periods. Each said graphical metaphor comprises event icons which group the visual digital objects associated with the selected time period according to events. The icons are proportionately sized to indicate the number of visual digital objects in the group relative to the total number of visual digital objects associated with the selected time period.

In another aspect of the invention a viewable histogram timeline is provided, the histogram timeline comprises: a first axis with a timeline representing a range of time organized into separate time periods and said second axis orthogonal to the timeline axis representing a number of digital multimedia objects; and wherein each time period on the histogram timeline is associated with a graphical metaphor extending from the first axis in a direction along the second axis to an extent that indicates a relative number of visual digital objects associated with the time periods, each said graphical metaphor comprising event icons which group the visual digital objects associated with the selected time period according to events, said icons being proportionately sized to indicate the number of visual digital objects in the group relative to the total number of visual digital objects associated with the time period.

A computer storage medium having instructions stored therein for causing a computer to perform the method.

These digital objects can be digital still images, digital audio files, digital video segments, graphics files, or related multimedia data. It is an important feature of the present invention that the use of a histogram timeline permits effective interaction with selecting either single media or multimedia digital objects in a database.

ADVANTAGES

It is an advantage of the present invention that the generation of a histogram timeline facilitates the representation of a collection of multimedia objects to a user and to facilitate the interaction and selection of the objects.

DETAILED DESCRIPTION OF THE INVENTION

The present invention provides an effective method of representing a collection of multimedia or single media objects to a user and to facilitating the interaction with and selection of such objects. These objects are typically visual digital objects such as, for example, still image files, MPEG-1 motion sequences with sound, or digital audio objects such as "WAV" files, that can be collected by a user and distributed over a variety of media and storage locations.

The entire collection of these objects, or even some subset, can be so large as to make searching, annotating, processing, or viewing difficult.

With the notable exception of recorded music, the majority of these objects are, to the user, strongly associated with a date or event. This date is typically, though not necessarily, the date of the origination of the object data, as is the case with personal memories such as still images, sound recordings, and home video sequences.

Since each of these objects is typically associated with a date, it is natural to organize them according to dates. A timeline is a well-known method for showing events in chronological order, and representations of objects, such as thumbnail images, can be arranged on a timeline for display. However, in large collections more than one object can be associated with a particular date, and the collection can cover a long time span. In such cases, it is impractical to arrange thumbnails of all objects along the timeline. In accordance with the present invention, a more effective representation is to build a histogram timeline in which the number of objects associated with each date, or time interval, are represented in a graphical form such as a bar chart. More particularly, as will be seen, the histogram timeline represents visual digital objects organized according to predetermined time periods. Thereafter, thumbnail representations are produced after a selection from the histogram timeline.

Figure 1:
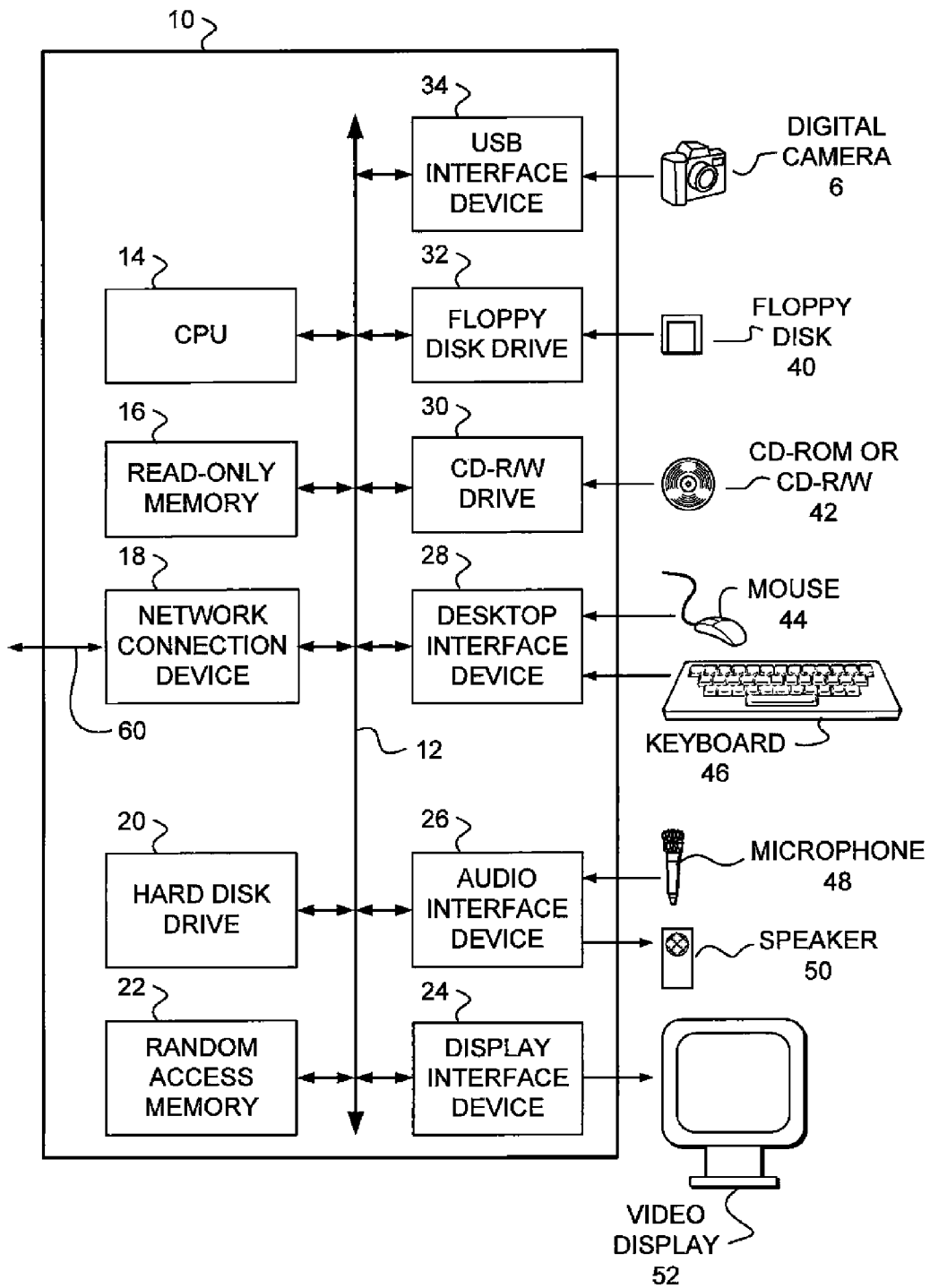
FIG. 1 is a block diagram of a system for practicing the present invention.

As shown in FIG. 1, a system for practicing the present invention includes a home computer 10, which can be, for example, a Dell Dimension L. The home computer 10 includes a CPU 14, which communicates with other devices over a bus 12. The CPU 14 executes software stored on a hard disk drive 20, for example, the well-known Windows 98 operating system software provided by Microsoft Corp. of Redmond, Wash. A video display device 52 is coupled to the CPU 14 via a display interface device 24. The mouse 44 and keyboard 46 are coupled to the CPU 14 via a desktop interface device 28. The home computer 10 also contains a CD-R/W drive 30 to read various CD media and write to CD-R or CD-RW writable media 42. A floppy disk drive 32 is also included to read from and write to floppy disks 40. An audio interface device 26 connected to bus 12 permits audio data from, for example, a digital sound file stored on hard disk drive 20, to be converted to analog audio signals suitable for speaker 50. The audio interface device 26 also converts analog audio signals from microphone 48 into digital data suitable for storage in, for example, the hard disk drive 20. In addition, the home computer 10 is connected to an external network 60 via a network connection device 18. A digital camera 6 can be connected to the home computer 10 through, for example, the USB interface device 34 to transfer still images, audio/video, and sound files from the camera to the hard disk drive 20 and vice-versa.

A collection of digital multimedia or single-media objects (digital images) can reside exclusively on the hard disk drive 20, compact disk 42, or at a remote storage device such as a web server accessible via the network 60. The collection can be distributed across any or all of these as well.

To represent the collection, first all of the digital multimedia objects must be associated together as a database. It will be understood that these digital multimedia objects can be digital still images, such as those produced by digital cameras; audio data, such as digitized music or voice annotation files in the "WAV" or "MP3" audio file format; and digital video segments with or without sound, such as MPEG-1 or MPEG-4 video. Digital multimedia objects also include files produced by graphic software, for example the well-known Visio graphics software product, and files representing text documents, such as those produced by the well-known Microsoft Word product. A database of digital multimedia objects can comprise only one type of object or any combination.

Figure 2:
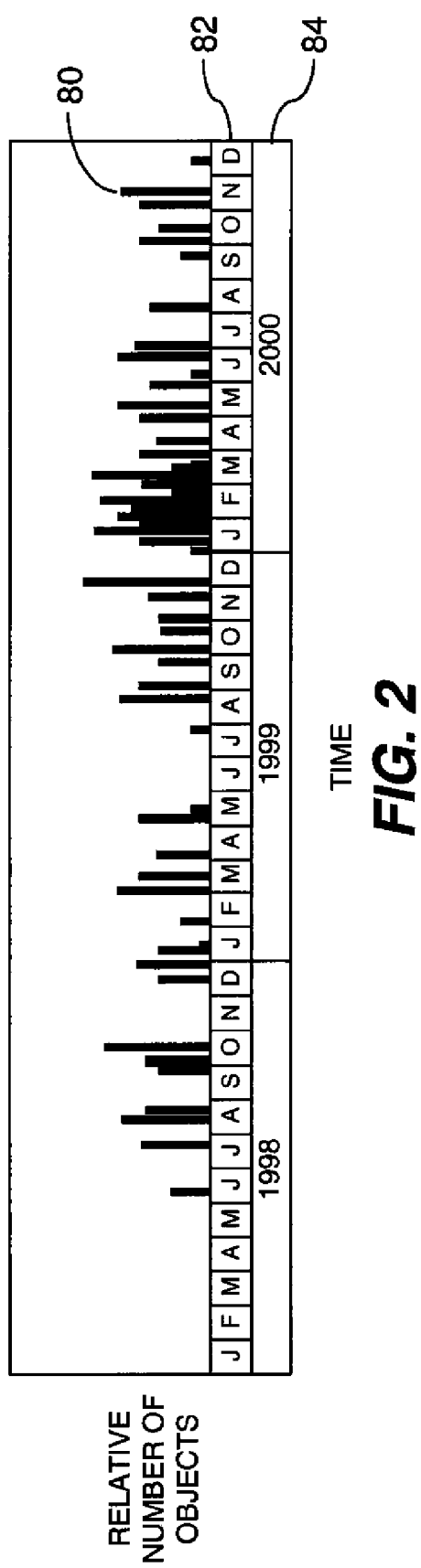
FIG. 2 is a histogram timeline diagram made in accordance with the present invention.

Once a collection of digital multimedia objects are associated together to form a database, they can be represented to the user in accordance with the present invention. FIG. 2 shows an example of a histogram timeline. In this example, the horizontal axis is enumerated in units of time and the vertical axis is enumerated in the number of digital multimedia objects. Alternatively, the vertical axis can be enumerated in the relative number of digital multimedia objects. The length of graphical bar 80 represents the relative number of objects in the chosen database in a given date bin on timelines 82 and 84. A date bin is the interval of time over which objects associated with a date in that interval are counted together. A date bin can have any duration, but would typically be no less than one day. Larger date bins might be constructed if the display area for the histogram was small or the length of the timeline was so large that short date bins could not be displayed adequately. In this example, time scale 82 is composed of month increments and time scale 84 is composed of year increments, though a single time scale is also possible.

Figure 3A:
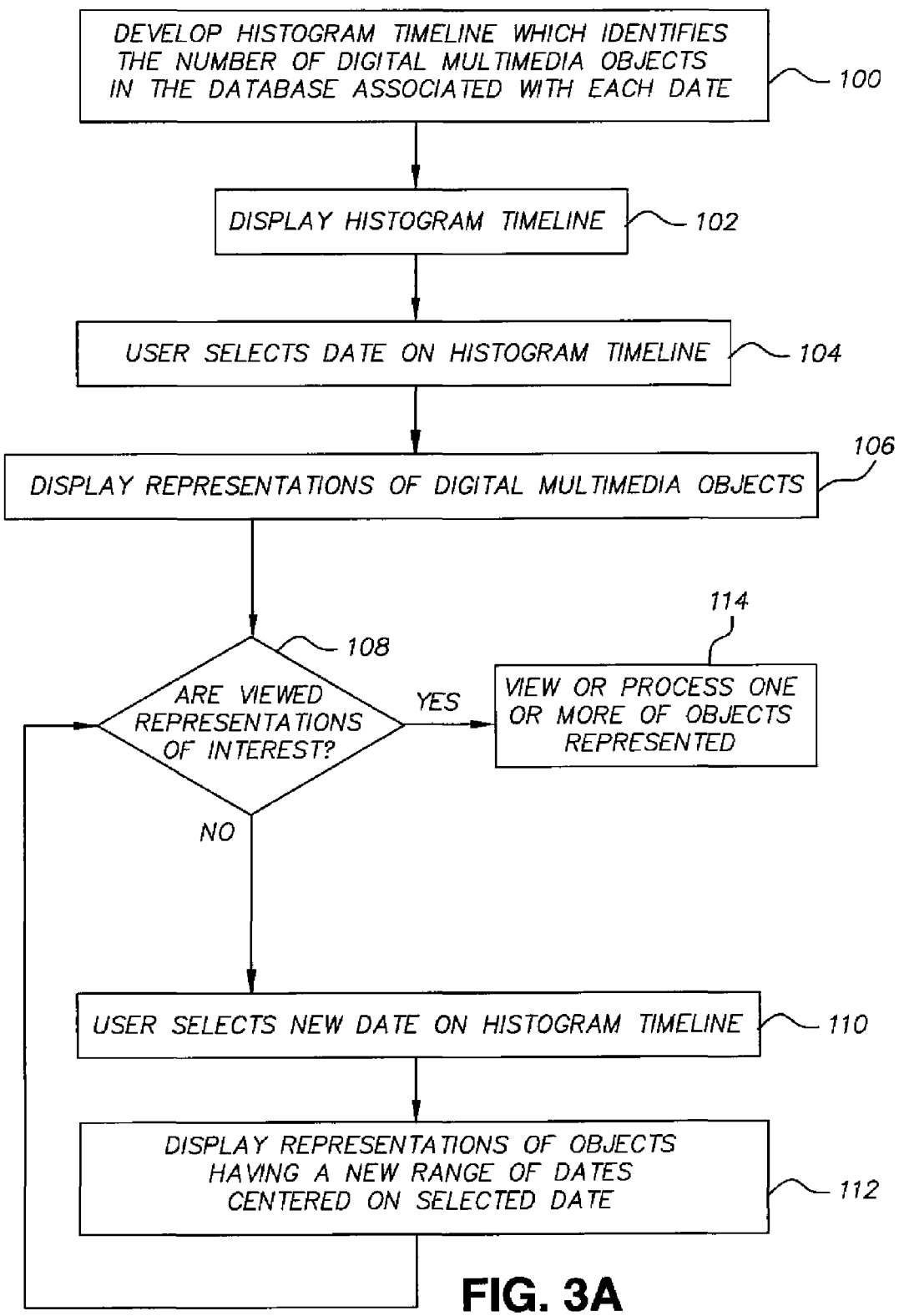
FIG. 3A is a flow diagram showing how a histogram timeline, such as in FIG. 2, can be made and further describing how to select a portion of the histogram timeline for viewing such thumbnail representations of such objects corresponding to such selected portion.

FIG. 3A is a flow diagram that illustrates the generation of the histogram timeline and the interactive steps for practicing the present invention. In step 100, the histogram timeline is formed by counting the number of objects in the database that are associated with each date. The result, internally, is an array of ordered pairs of numbers. One number in the pair represents a given date, and the associated number represents the number of objects associated with the date.

Figure 6A:
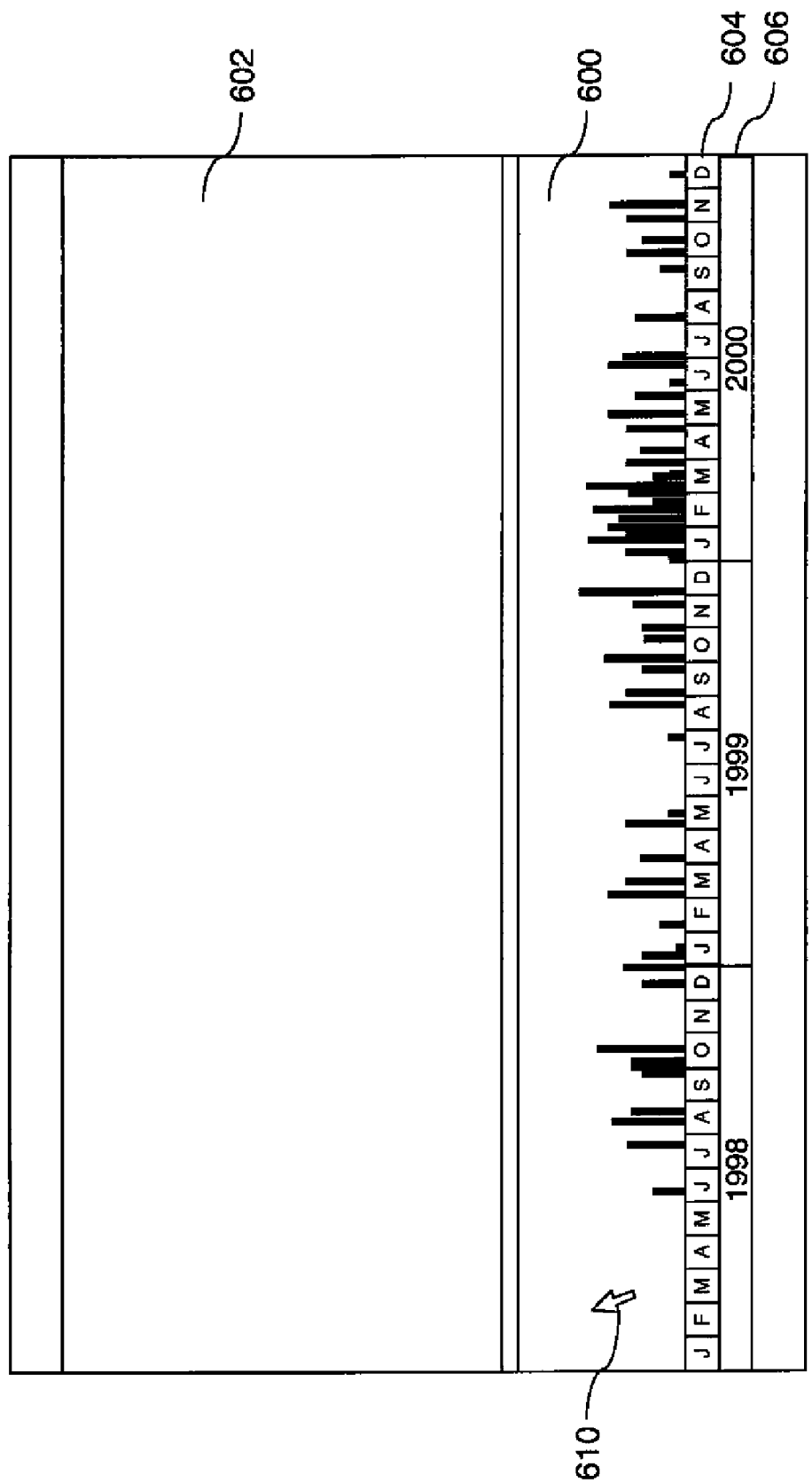
FIG. 6A is a depiction of a histogram timeline on a display screen in an initial state.

In step 102, the histogram timeline is displayed graphically to the user, as shown in FIG. 6A, with a predetermined range of dates (timeline) based, for example, on the earliest to latest dates associated with all of the objects in the chosen database. Region 600 denotes the area in which the timeline is located, and 604 and 606 are the fine and coarse timeline scales, respectively. Region 602 is a separate viewable area where iconic or thumbnail representations of digital multimedia objects can be displayed to the user. The user may also select one or more of the representations to view, listen to, and/or process. Pointer 610 is a selection device such as a mouse, joystick, or eye movement tracking apparatus.

Figure 6B:
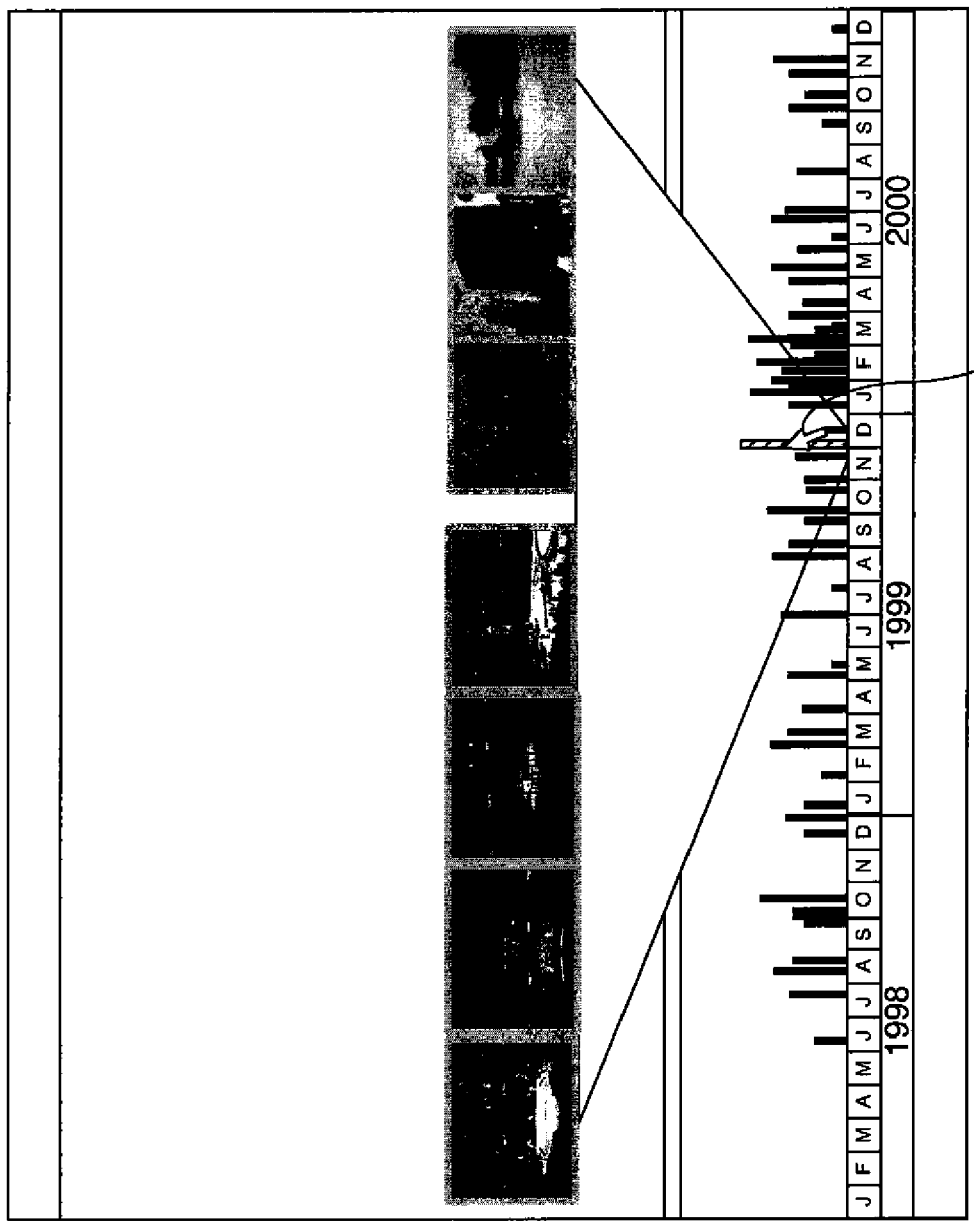
FIG. 6B is a depiction of a histogram timeline and thumbnail representations on a display screen after a portion of the timeline has been selected.

Referring again to FIG. 3A, in step 104 the user selects a date of interest on the histogram timeline. This is depicted in FIG. 6B, where the user selects a date by moving the mouse to move a graphical pointer 610 to a particular histogram bar on the timeline and "clicking" the mouse button. If the date bins were longer than one day, then "clicking" on a histogram bar would select the range of dates included in the date bin interval. After selection of the date, thumbnail or iconic representations appear, corresponding to the objects associated with the chosen date, according to step 106 in FIG. 3A. Additionally, the thumbnail and iconic representations displayed, can be grouped according to the events to which they relate, as described in commonly assigned U.S. patent application Ser. No. 09/163,618 filed Sep. 30, 1998, entitled "A Method for Automatically Classifying Images Into Events" by Alexander C. Loui et al., and commonly assigned U.S. patent application Ser. No. 09/197,363 filed Nov. 20, 1998, entitled "A Method for Automatically Comparing Content of Images for Classification Into Events" by Alexander C. Loui et al., the disclosures of which are incorporated herein by reference.

In step 108, the user decides if the representations displayed are of interest. If not, the user can then select a new date on the histogram timeline, as shown in step 110. In step 112, new iconic or thumbnail representations are displayed corresponding to objects associated with the new date. Alternatively, other ways can be used to access thumbnail or iconic representations extending just outside of the range displayed to the user. For example, a scroll bar oriented below the representations could be used to scroll forward and backward in time, with the representations and the timeline changing in response. In the practice of the present invention, it will be understood that "dragging" a thumbnail to a new viewing position can be accomplished by selecting it and then moving the pointer. As the thumbnail is dragged, thumbnail representations in the direction of motion are "pushed" off the screen, and new thumbnail representations are "pulled" into the screen from the opposite side.

Referring again to FIG. 3A, if one or more of the thumbnail representations is of interest, the user can then move on to view or process one of the objects represented as shown in step 114. Processing can entail, for example, invoking an image viewer for viewing an image at a higher resolution, invoking an image editor to edit a still image, invoking an audio player for listening to audio data, or invoking a video player to view a video sequence. Processing can also entail the addition of audio, graphical, and text annotation to an object, transferring objects to another database or collection, or some other function based on the digital multimedia object type and user's desire.

Figure 3B:
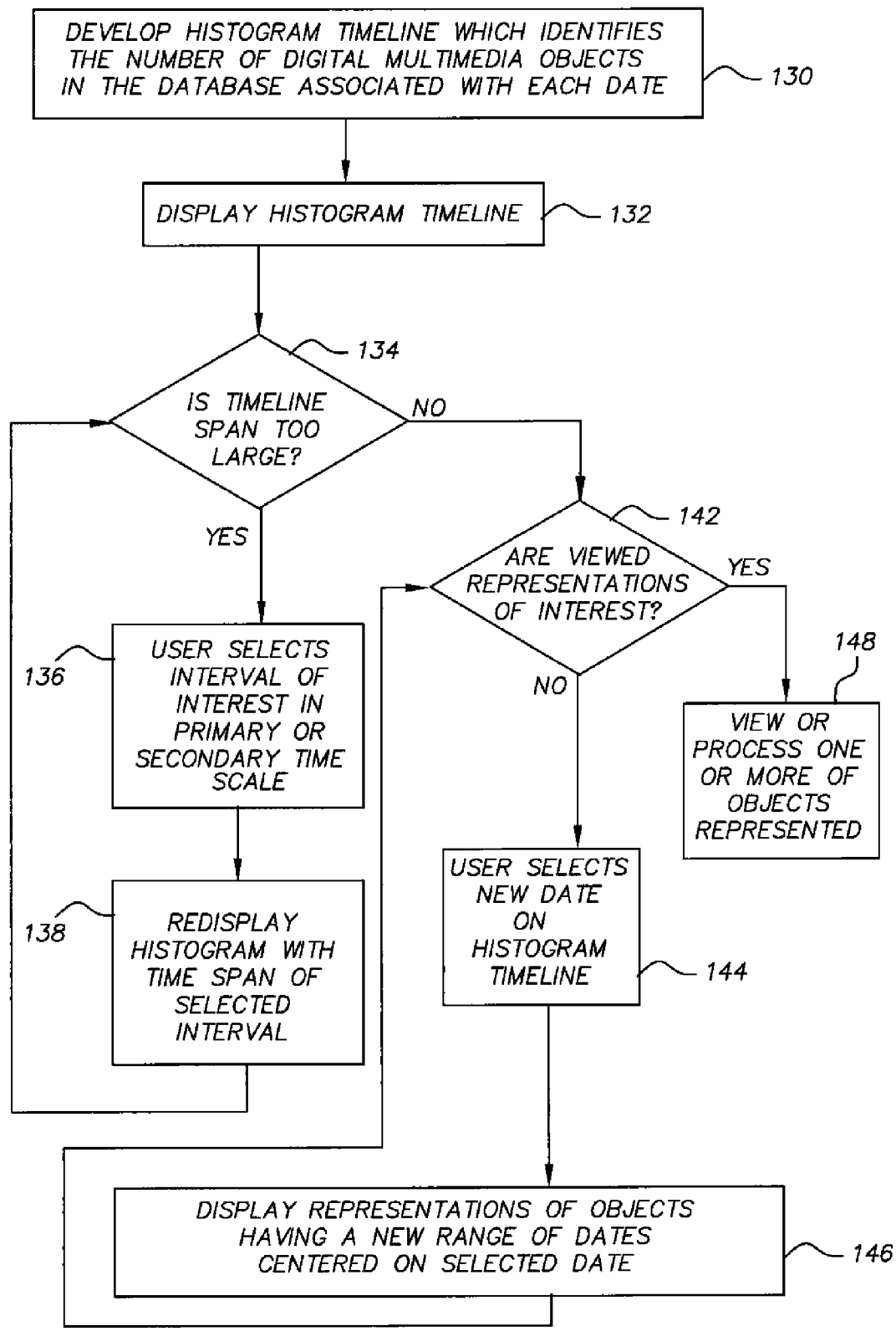
FIG. 3B is a flow diagram showing the determination of the desired span of the histogram timeline and showing how to select a portion of the histogram timeline for viewing such thumbnail representations of such objects corresponding to such selected portion.

FIG. 3B is a flow diagram that illustrates the generation of a histogram timeline and further steps involved in interacting with it. The histogram timeline is formed as shown in step 130 by counting the number of objects in the database that are associated with each date. The result, internally, is an array of ordered pairs. One number in the pair represents a given date, and the associated number represents the number of objects associated with the date.

In step 132, the histogram timeline is displayed graphically to the user, as shown in FIG. 6A, with a predetermined range of dates (timeline) based, for example, on the earliest to latest dates associated with all of the objects in the chosen database. The histogram is displayed with two time scales; a primary time scale having coarse intervals, such as whole years, and an adjacent secondary time scale having finer intervals such as whole months.

Figure 6C:
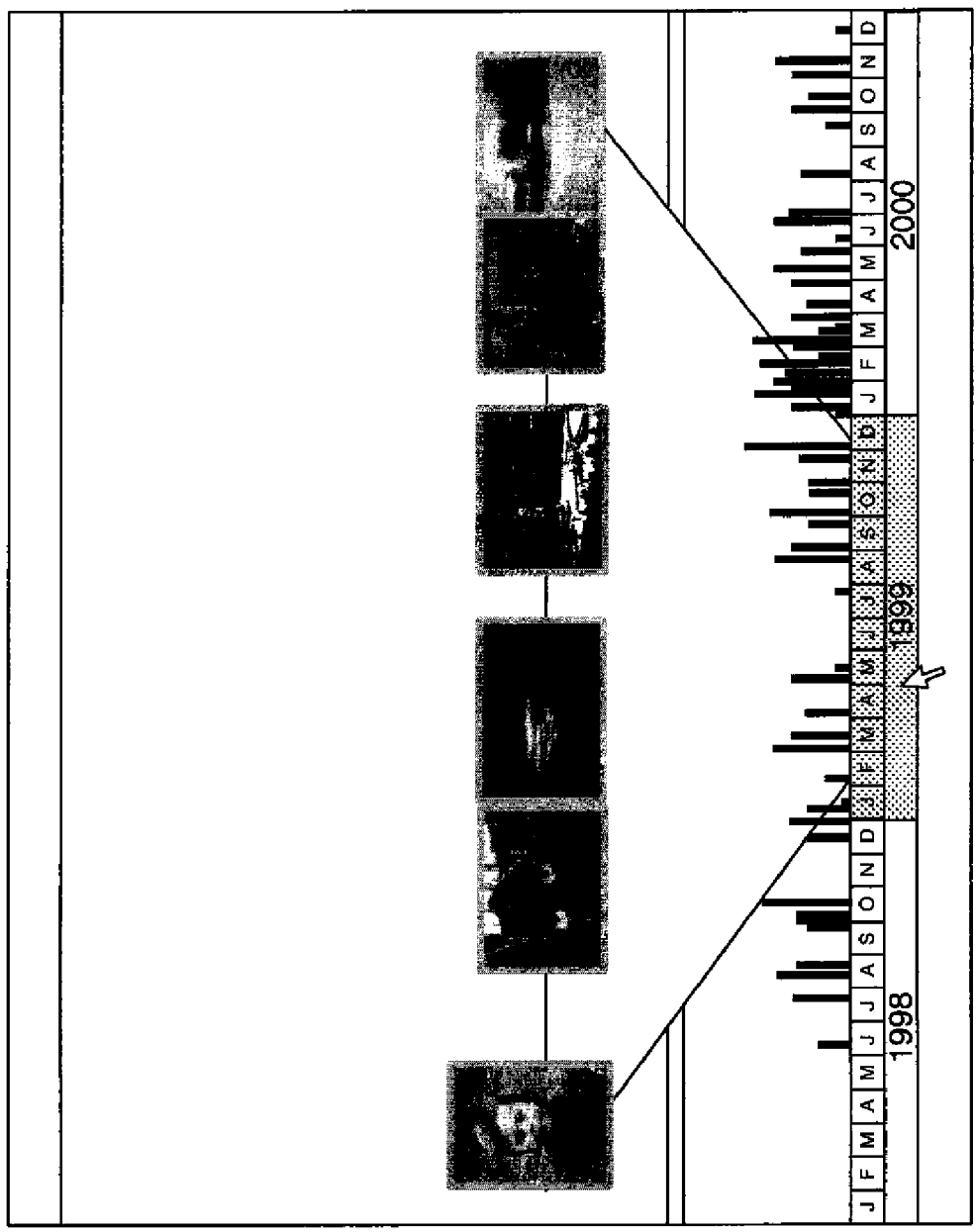
FIG. 6C is a depiction of a histogram timeline and thumbnail representations on a display screen during selection of a shortened time scale.
Figure 6D:
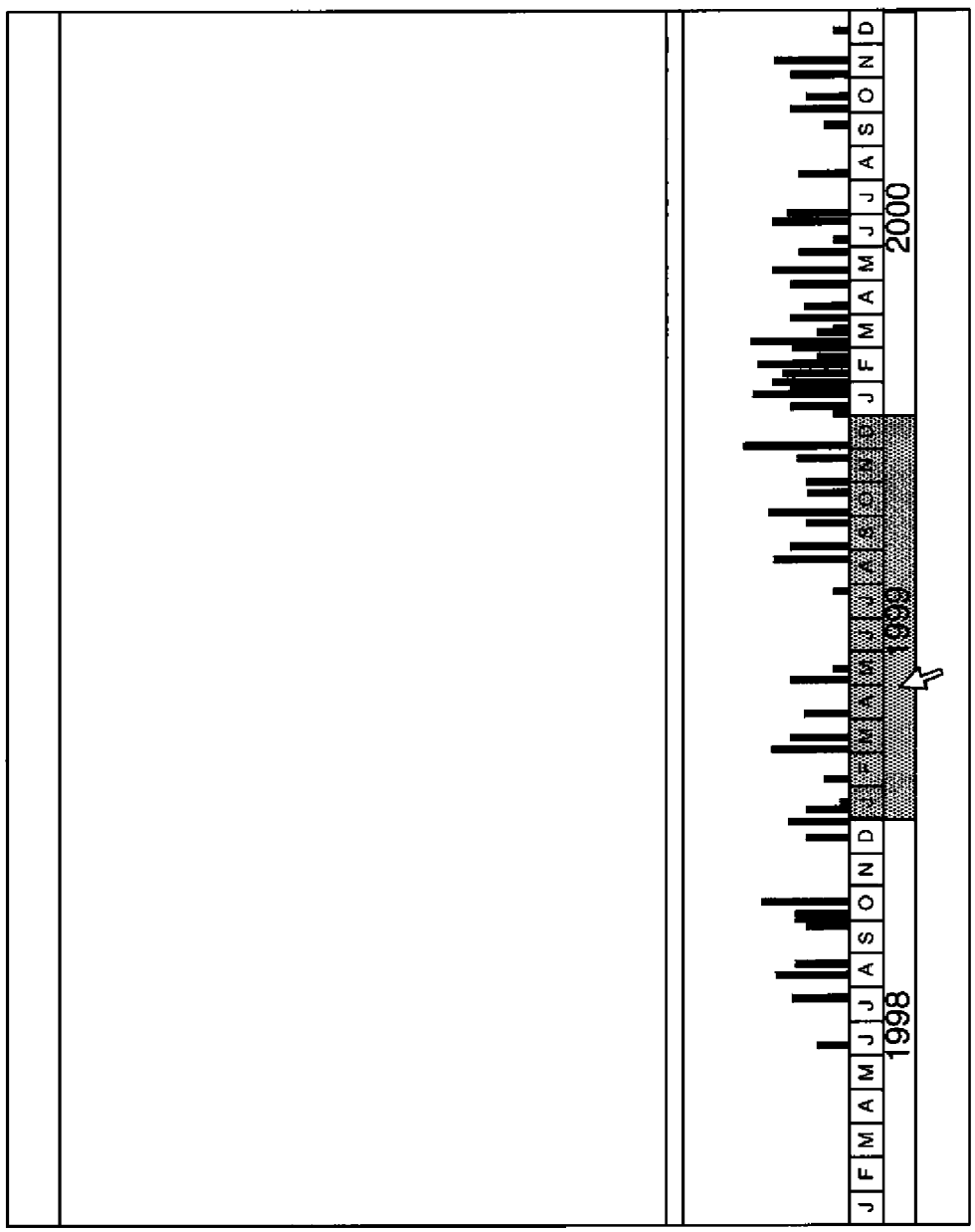
FIG. 6D is a depiction of a histogram timeline without thumbnail representations on a display screen during selection of a shortened time scale.

In step 134, the user determines whether or not the timeline span is too large to work with effectively. If so, then in step 136 the user selects an interval either on the coarse primary time scale or the finer secondary time scale. FIG. 6C illustrates selection of the year 1999 on the coarse time scale, with representations of randomly selected objects from that year appearing while the date is selected by, for example, holding down a mouse button. In addition, the region denoting the year 1999 is highlighted to suggest selection. The appearance of the representations can persist as long the mouse button is held down by the user. Alternatively, if the display of representations is slow relative to the amount of time the user wishes to hold down the mouse button, only the region denoting the year 1999 is highlighted without displaying any representations, as illustrated in FIG. 6D.

Figure 6E:
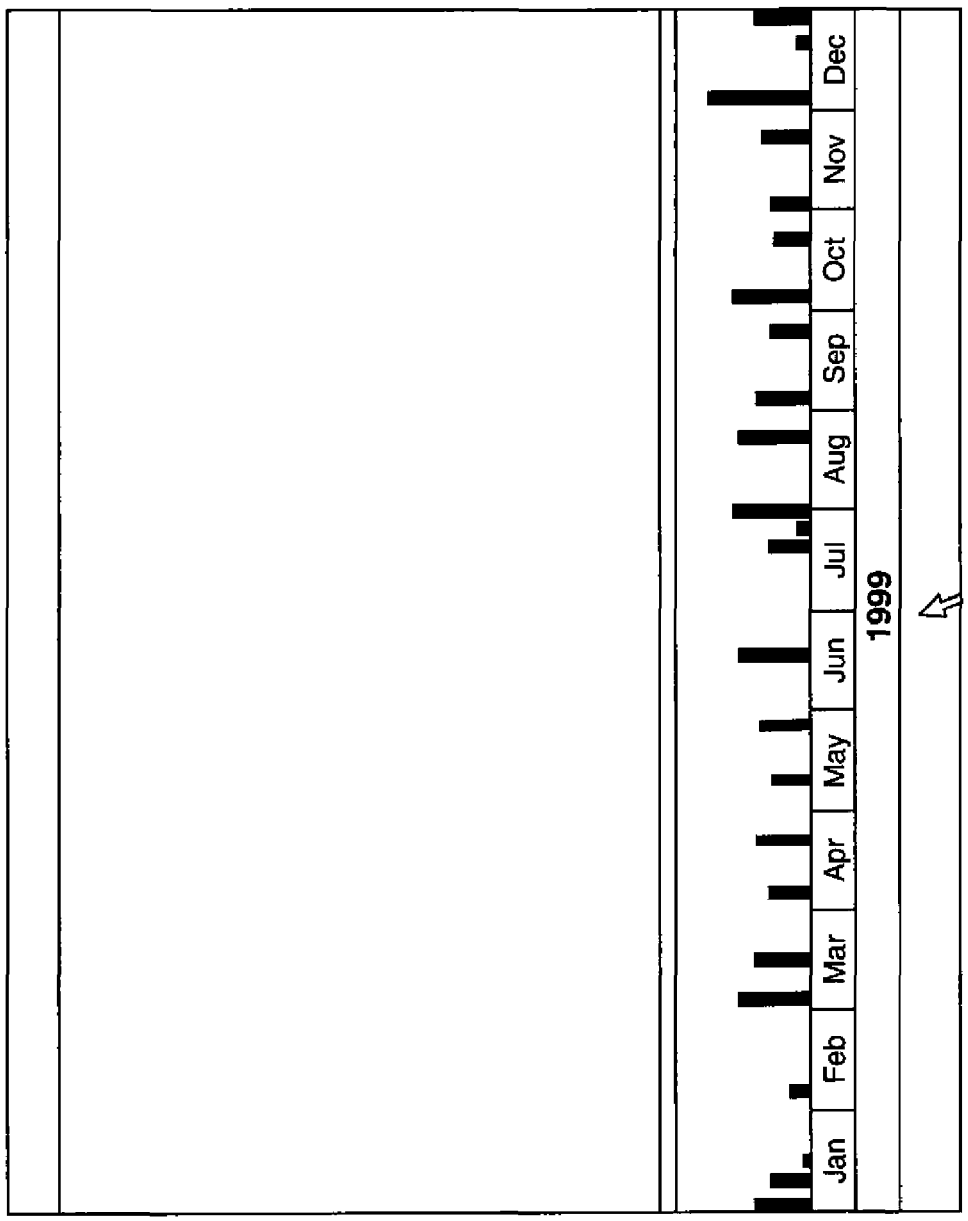
FIG. 6E is a depiction of a histogram timeline on a display screen after selection of a shortened time scale.
Figure 6F:
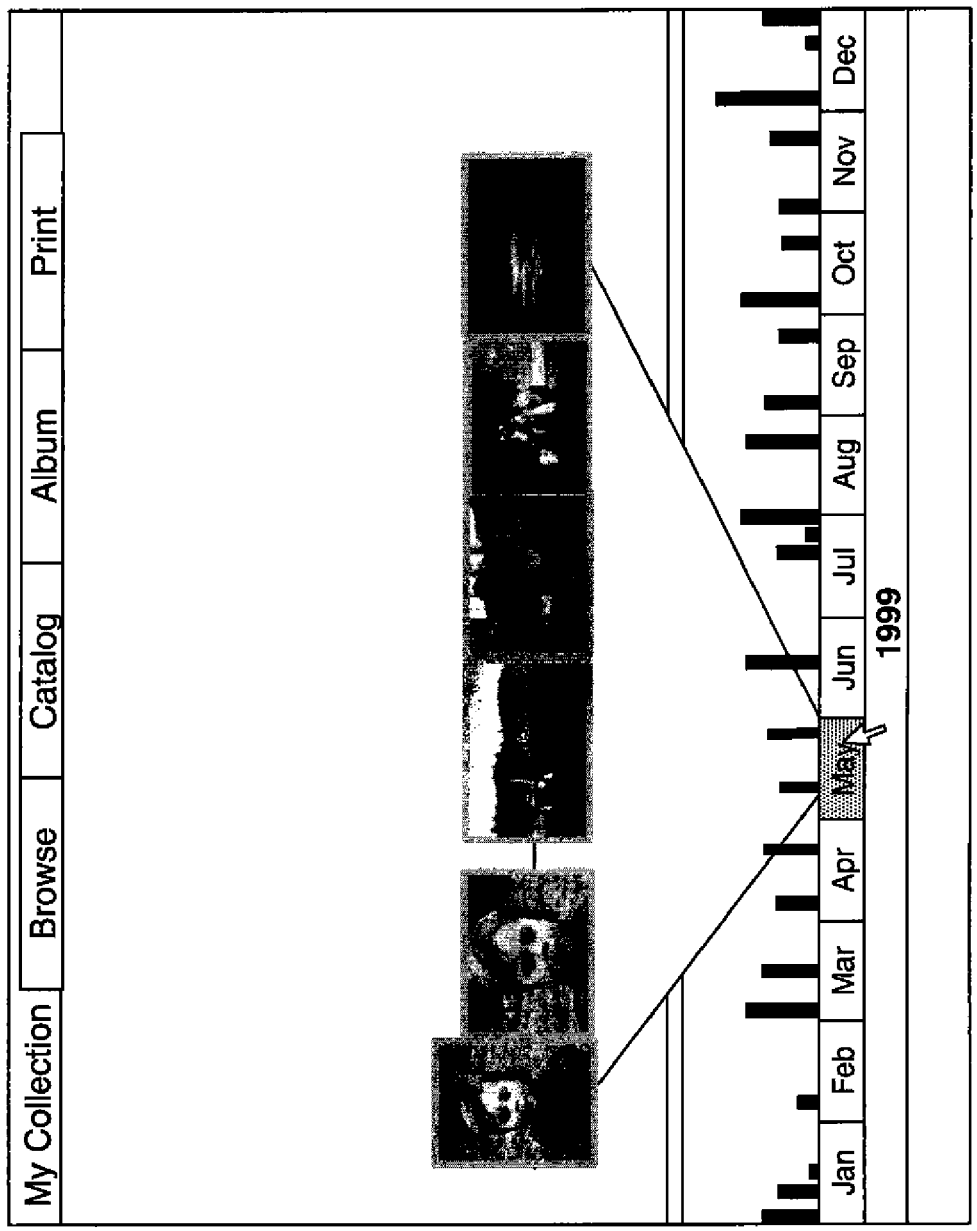
FIG. 6F is a depiction of a histogram timeline and thumbnail representations on a display screen during further selection of a shortened time scale.
Figure 6G:
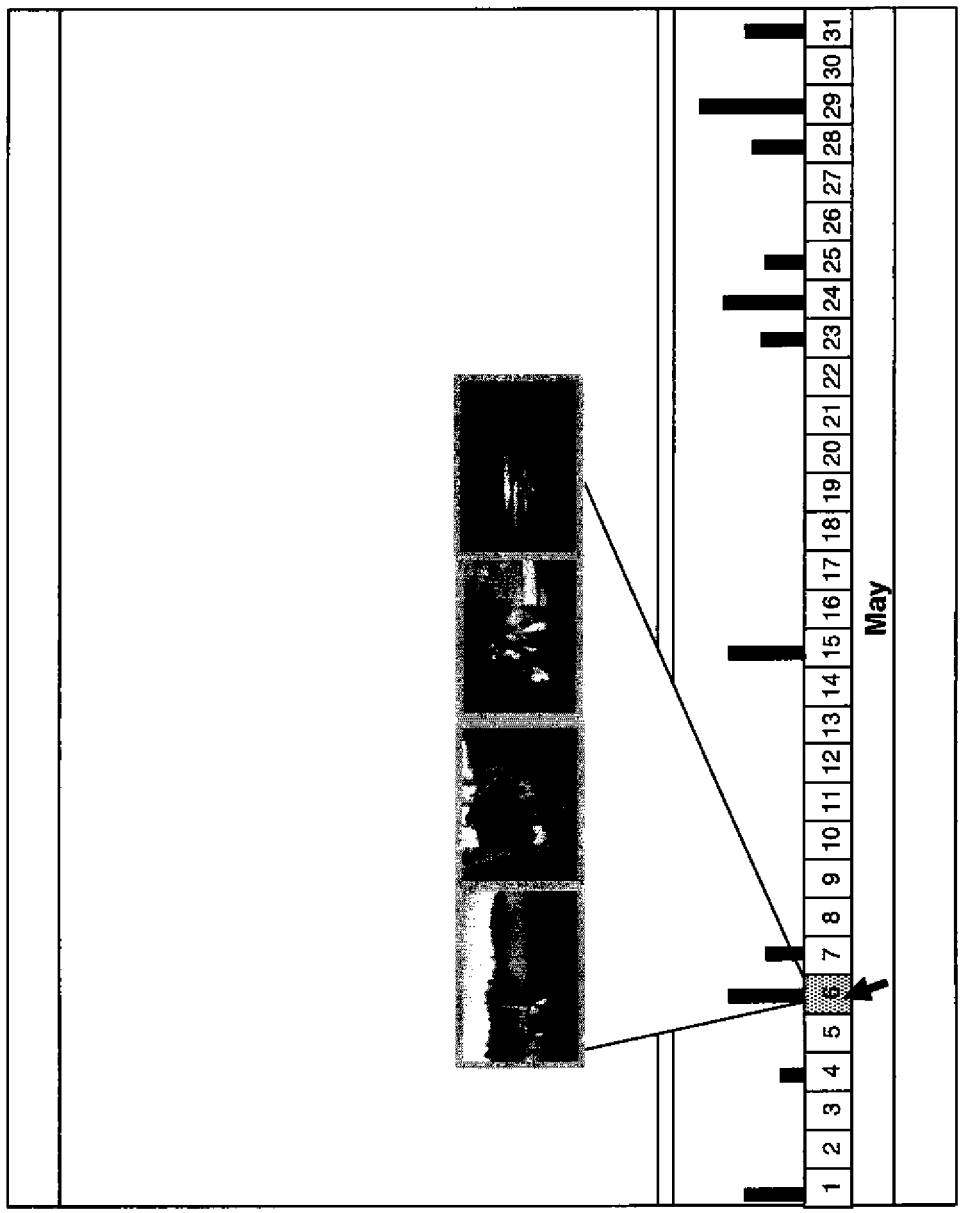
FIG. 6G is a depiction of a histogram timeline and thumbnail representations on a display screen during further selection of a shortened time scale.

Upon release of the mouse button by the user, the histogram timeline is redisplayed according step 138 of FIG. 3B, with the earliest and latest dates of the histogram timeline changed to correspond with span of the interval selected, as illustrated in FIG. 6E. If the process is repeated, then the primary and secondary timeline intervals are changed as appropriate. For example, if the user selects the month of May 1999, as shown in FIG. 6F, then new thumbnail or iconic representations corresponding to objects associated with May 1999 are displayed while the mouse button is held down by the user. When the user releases the mouse button, histogram timeline is redisplayed such that the earliest and latest dates of the histogram timeline correspond with the month of May 1999. The coarse intervals are then months and the fine intervals days as illustrated in FIG. 6G. Selection of any day in the month, also shown in FIG. 6G, results in thumbnail or iconic representations to be displayed, corresponding to digital multimedia objects associated with that day.

At any point in the process, as shown in step 144 of FIG. 3B, the user can select a date by selecting a bar on any of the histogram timeline representations, as illustrated earlier in FIG. 6B. Representations of digital multimedia objects corresponding to the date are then displayed as shown in step 146. If the user was interested in a particular thumbnail representation according to step 142, the user could then view or otherwise interact with the actual object or set of objects by, for example, "double clicking" on a representation, as shown in step 148.

Figure 4:
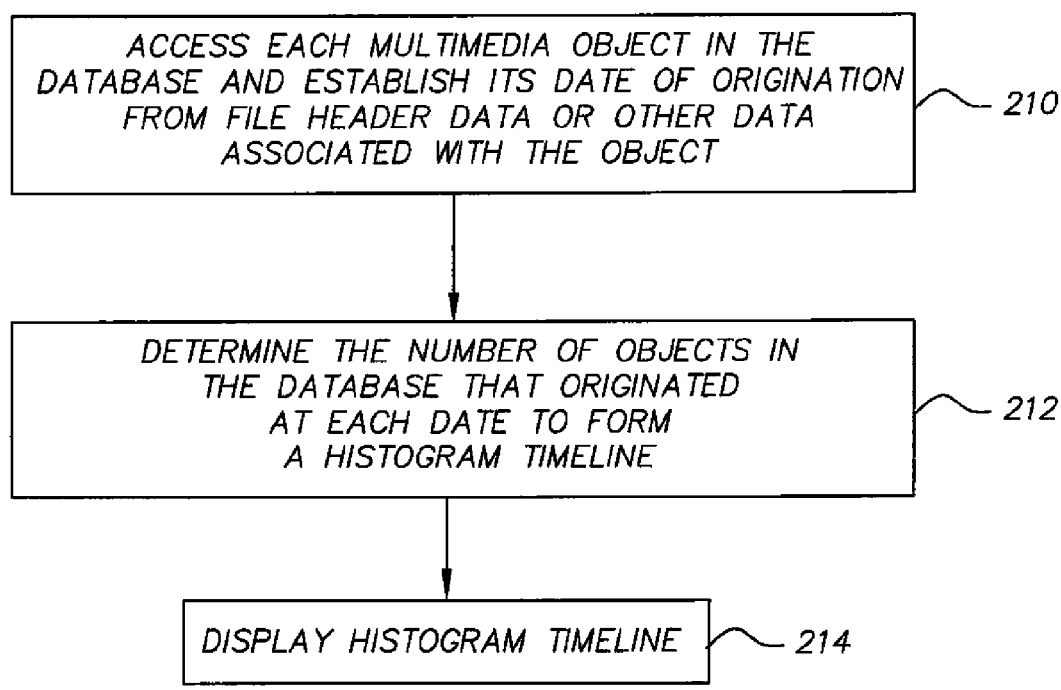
FIG. 4 is a flow diagram showing, in more detail, how a histogram timeline can be made.

FIG. 4 is a flow diagram that describes in more detail how a histogram timeline in accordance with the present invention can be generated. In step 210, each multimedia object in the database is accessed and a date of origination is established from either header data, such as capture date from a digital camera, or from some other data associated with the object. For example, in the absence of reliable header information, the object's file origination date could be used. Alternatively, user-entered annotation could be searched. In step 212, the number of objects associated with each date are determined to form a histogram timeline. Finally, in step 214, the histogram timeline is displayed to the user.

Figure 5:
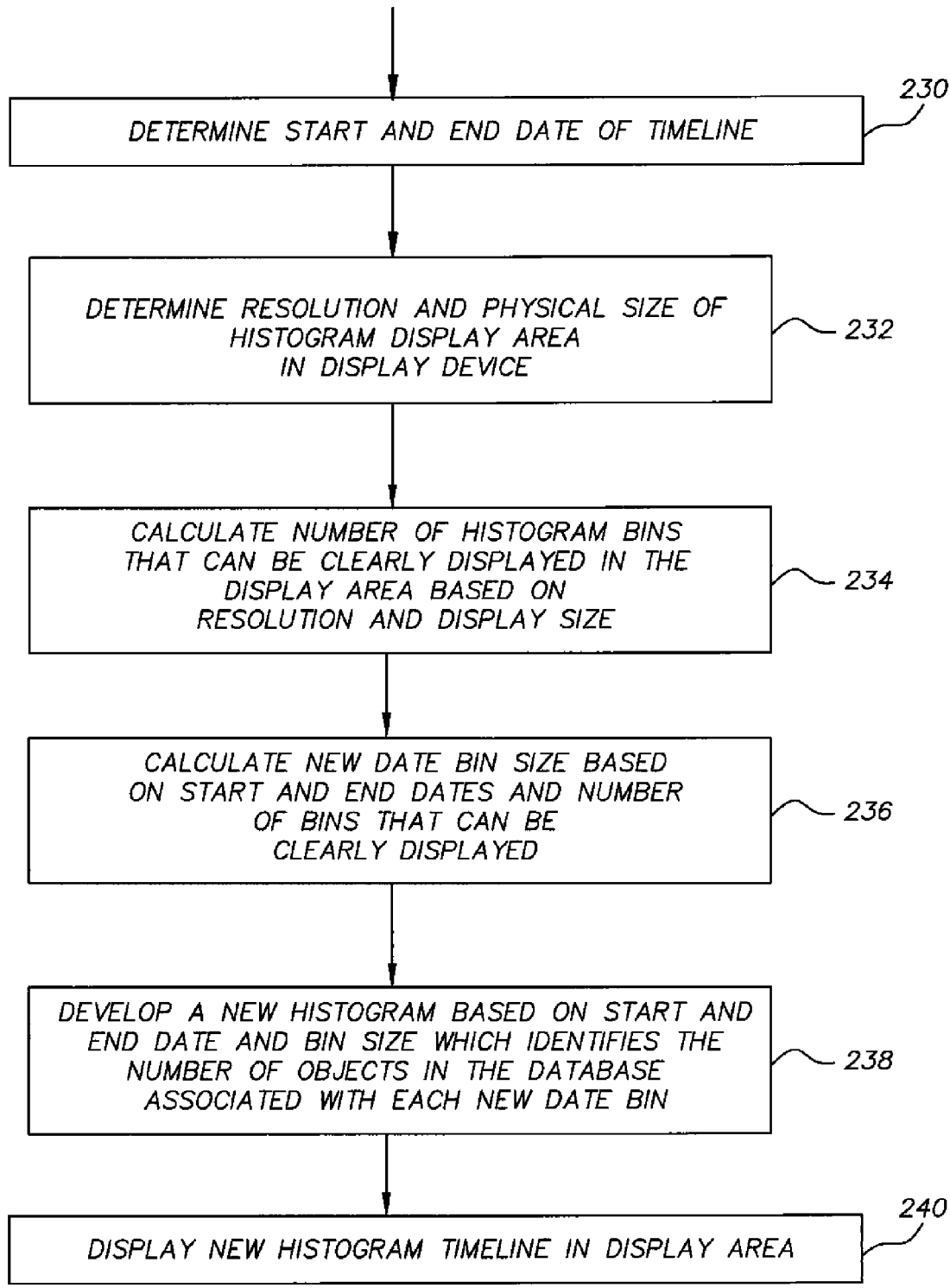
FIG. 5 is a flow diagram showing how the histogram timeline can be made responsive to the resolution and size of the display device.

FIG. 5 depicts a flow diagram showing how the histogram timeline can be made responsive to the resolution and size of the display device. This can be important if the histogram is to be displayed on a portable device such as a cellular phone or personal digital assistant where display resolution and size are limited. It is also useful on any display if the time span of the histogram timeline is very long and individual date bins cannot be adequately displayed.

Once the histogram timeline is generated, the start and end dates of the histogram timeline to be displayed are determined as shown in step 230. In step 232, the resolution and physical size of the display area are determined. For example, resolution could be expressed as the number of horizontal and vertical pixels constituting the display area, and the size of the display area could be expressed as horizontal and vertical dimensions in millimeters.

Next, in step 234, the number of histogram bins that can be clearly displayed is calculated. The number of histogram bins that can be clearly displayed can, for example, include additional factors such as a human visual system model.

In step 236, based on the number of histogram bins that can be clearly displayed and the desired start and end date of the histogram timeline, new date bin sizes are calculated. In step 238, a new histogram timeline is generated with the modified bin sizes. Finally, in step 240, the modified histogram timeline with more visible bin size is displayed.

As is disclosed in commonly assigned U.S. patent application Ser. No. 09/742,028, previously incorporated by reference herein, methods are shown that can be used to provide a timeline axis/metaphor in accordance with the present invention, and further methods are shown that can be used to implement the embodiment of the timeline histogram GUI of the present invention as claimed. These methods are described with reference to FIGS. 1A-7 of the '028 application. These drawings and the accompanying disclosure from the '028 application are hereby incorporated as FIGS. 7A-13 of the present application as follows.

Figure 7A:
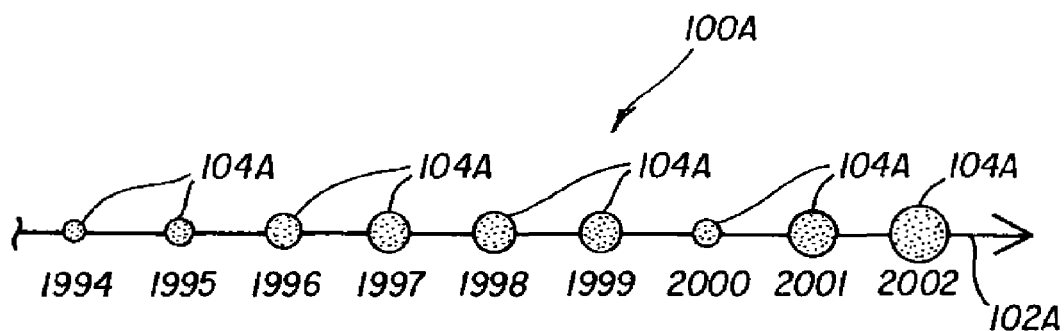
FIG. 7A is a yearly-based timeline display used in the graphical user interface (GUI) of the present invention, the timeline having chronological icons which are proportional in size to the number of pictures in a database corresponding to the identified years.
Figure 7B:
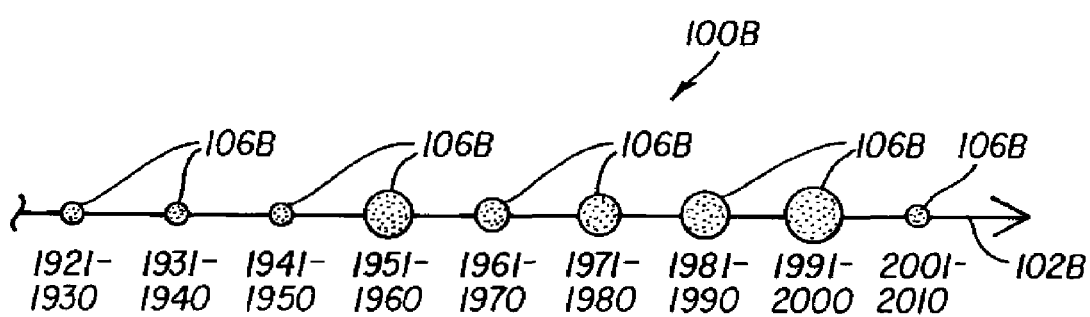
FIG. 7B is an alternate decade-based timeline display suitable for use in the GUI of the present invention, the timeline having chronological icons which are proportional in size to the number of pictures in a database corresponding to the identified decades.

The first level of the GUI described in the '028 application contains a timeline metaphor (displayed for the user) such as the one 100A in FIG. 7A, or the one 100B in FIG. 7B. The timeline metaphor 100A is marked by the years (of capture) covered by the pictures of the database in question. In an alternate embodiment, the timeline metaphor 100B is marked by the decades (of capture) covered by the database pictures. More particularly, the timeline 102A has year-picture icons 104A evenly spaced with year markers, while the timeline 102B has decade-picture icons 106B evenly spaced with decade markers.

Although shown as circular in shape, the icons 104A can be of any other suitable shape including, but not limited to, spherical, elliptical, or irregular. More important to the '028 application than the shape of the icons 104A and 106B is the fact that the icons are sized to show the relative number of pictures represented by the corresponding time markers. For example, the sample digital image database contains many more pictures captured in the year 2001 than in the year 2000. Consequently, the icon representing to the year 2001 is relatively large, while the icon representing the year 2000 is relatively small. In the alternate embodiment of FIG. 7B, the number of pictures in the sample database captured in the 1991-2000 decade are relatively large, while the number of pictures captured in the 1941-1950 are relatively small. Consequently, the icon sizes are relatively large, and relatively small, respectively.

Figure 8A:
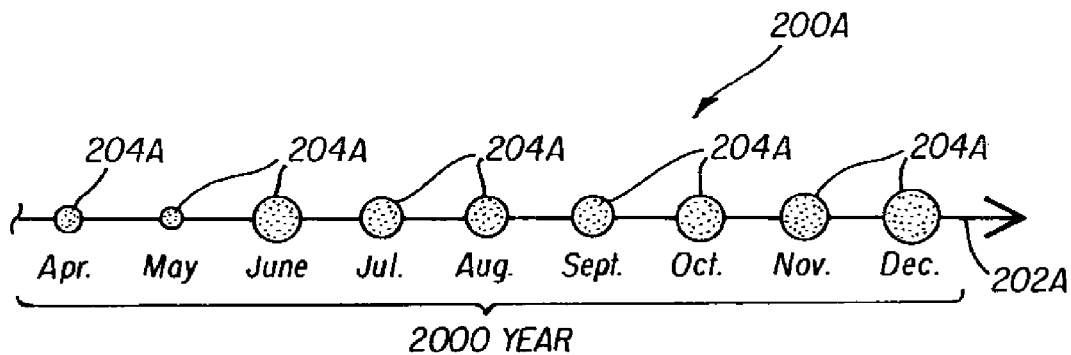
FIG. 8A is a monthly-based display linked to the timeline in FIG. 1A in general, and in particular to a year specified by a user.
Figure 8B:
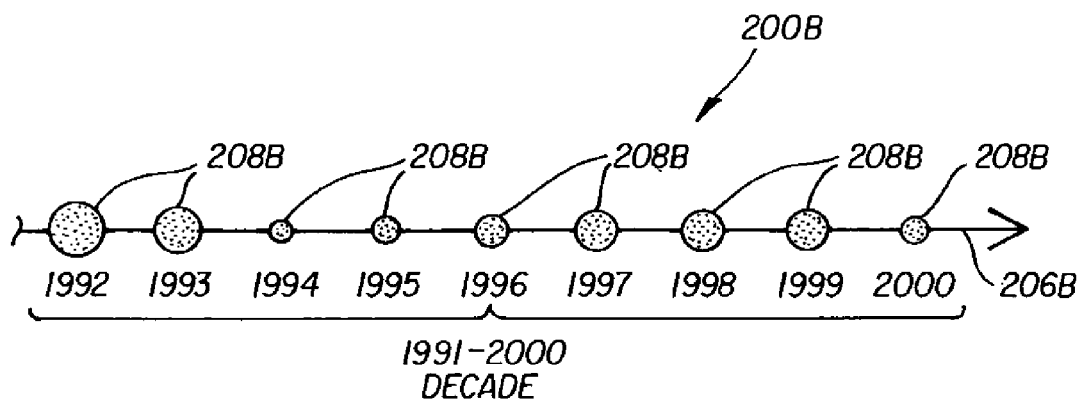
FIG. 8B is a yearly-based timeline display linked to the timeline in FIG. 1B, which has chronological icons which are proportional to the number of pictures in a database corresponding to the years in a decade specified by a user.

To move to the next level of the GUI of the '028 application, a user activates one of the year (or decade) icons in FIGS. 7A or 7B to produce a new timeline metaphor 200A or 200B shown in either FIGS. 8A or 8B for greater temporal specificity. Just as with FIGS. 7A and 7B, the timeline metaphors 200A and 200B contain timelines and relatively sized picture icons.

In the example shown in FIG. 8A, the user has activated (by a click of a pointing device such as a "mouse," for example) the year 2000 icon as being of further interest. That is, the user is interested in browsing pictures captured in the year 2000. The new timeline 202A further refines the year 2000 into the months of the year. From the example, it is apparent by the relative size of the icons 204A, that many more pictures were captured in the month of December than in the month of May. In the alternate timeline metaphor 200B of FIG. 8B, the user has chosen to further refine the timeline metaphor of FIG. 7B, by showing the year-picture icons 208B on the timeline 206B to display the relative size of pictures captured for each of the years in the 1991-2000 decade. In this example, the pictures captured in the year 1999 are much more numerous than the pictures captured in the year 2000, so that the relative sizes of the corresponding icons are large and small, respectively.

Figure 9:
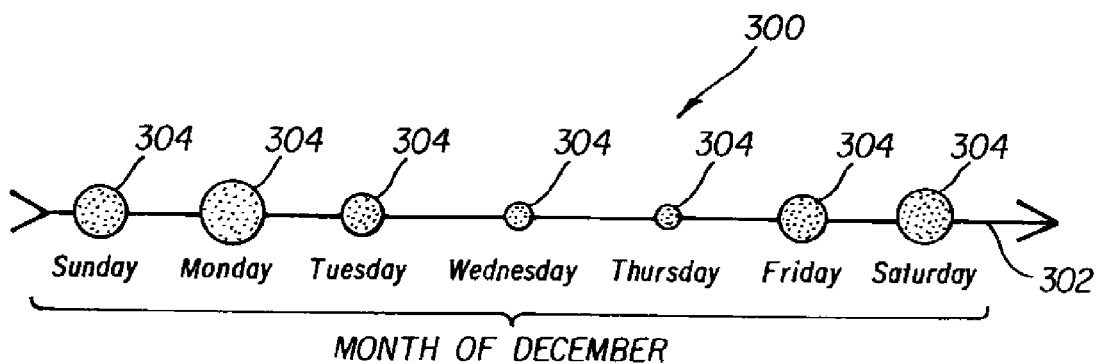
FIG. 9 is a weekly-based (Sunday through Saturday, etc.) display linked to the timeline in FIG. 8A in general, and in particular to a month specified by a user.
Figure 10:
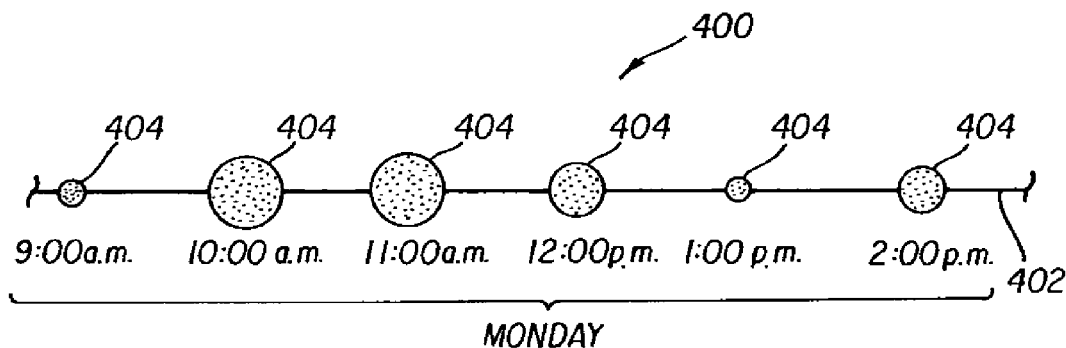
FIG. 10 is a daily-based (by hour of the day) display linked to the timeline in FIG. 9 in general, and in particular to a day of the week specified by a user.
Figure 11:
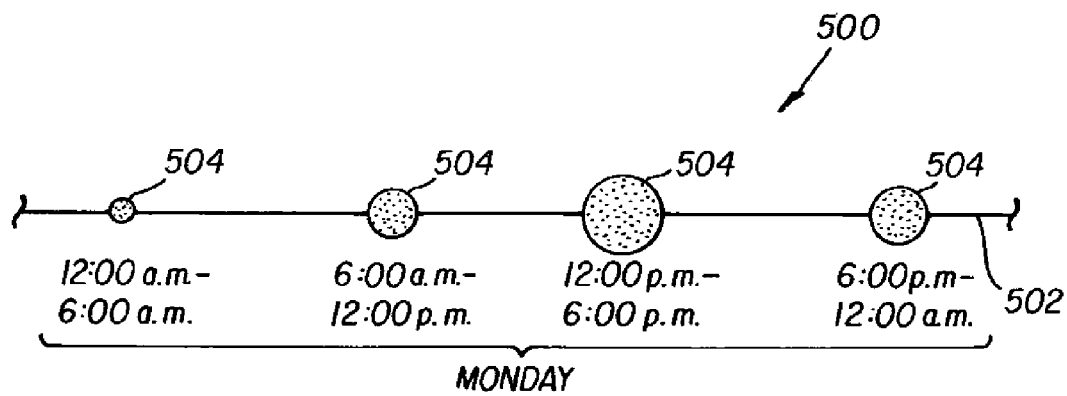
FIG. 11 is an alternate daily-based (by blocks of time) display linked to the timeline in FIG. 9 in general, and in particular to a day of the week specified by a user.
Figure 12:
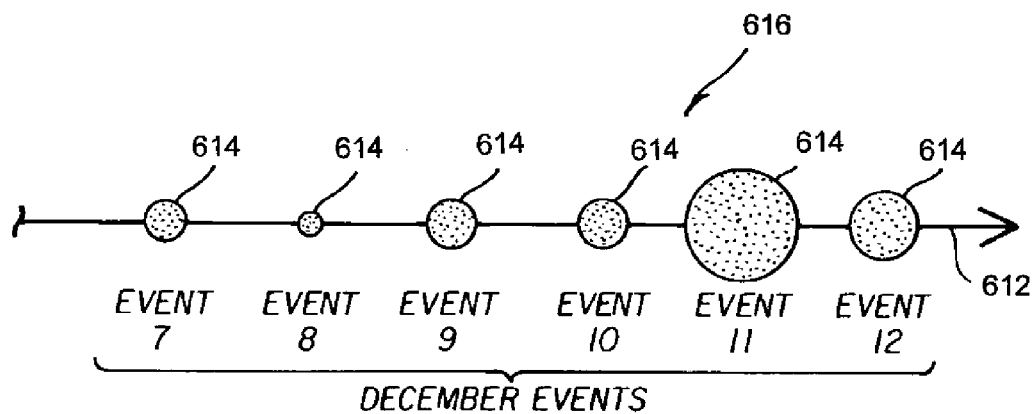
FIG. 12 is an event-based display linked to the timeline in FIG. 8A in general, and in particular to a month specified by a user.

Activating an icon representing the picture grouping of interest can further refine the timeline metaphors of each level of the GUI. The timeline metaphor 300 in FIG. 9 is linked to either the timeline metaphor 200A or 200B, and groups the pictures in the image database according to the days of the week with a timeline 302 and day icons 304, which are, again, proportionately sized to represent the relative number of pictures grouped according to the days of the week. The timeline metaphor 400 in FIG. 10 is linked to the timeline metaphor 300 in FIG. 3, and groups the pictures in the image database according to the time of day with a timeline 402 and day icons 404. In the example shown, the pictures captured on all Mondays are grouped according to their capture time. An alternate embodiment of the timeline metaphor 400 in FIG. 10 is the timeline metaphor 500 in FIG. 11, where instead of grouping the pictures of a particular day by the hour of capture, the pictures are grouped by a block of time.

The GUI of the '028 application allows a user to display metaphors which group the pictures in a digital image database in other ways besides the date or time of capture by linking timeline metaphors to other metaphors. The display line 612 in FIG. 12 displays proportionately sized icons 614 which group the database pictures according to events specified by a user inputting the pictures. Linked to the timeline metaphor 200A in FIG. 8A, the metaphor 616 in FIG. 12 groups the pictures captured in a particular month—December in the example—into identifiable events, such as birthdays, holidays, etc. For example, the "Event 11" icon might represent pictures captured on Christmas Day, while the "Event 12" icon might represent pictures captured on New Year's Eve.

Figure 13:
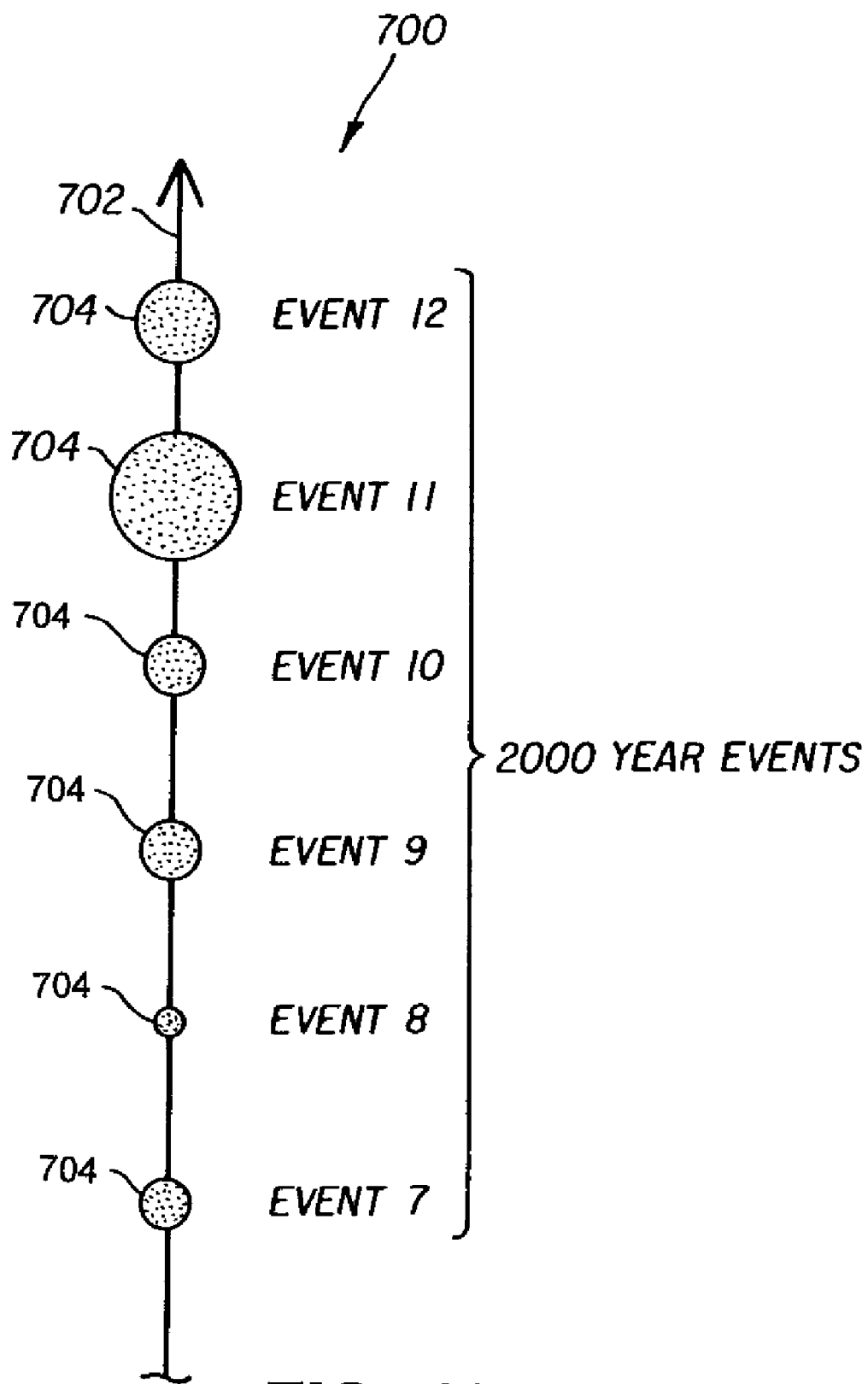
FIG. 13 is an alternate embodiment (vertical) of the display in FIG. 12.

While the metaphors of the GUI of the '028 application might generally be oriented in a common direction, different levels might be displayed in an orthogonal direction relative to previous linked levels, such as the metaphor 700 in FIG. 13, having a display line 702 with icons 704 which might be linked to the timeline metaphor 100A in FIG. 6A.

A computer program product can include one or more storage medium, for example; magnetic storage media such as magnetic disk (such as a floppy disk) or magnetic tape; optical storage media such as optical disk, optical tape, or machine-readable bar code; solid-state electronic storage devices such as random access memory (RAM), or read-only memory (ROM); or any other physical device or media employed to store a computer program having instructions for practicing a method according to the present invention.

The invention has been described in detail with particular reference to certain preferred embodiments thereof, but it will be understood that variations and modifications can be effected within the spirit and scope of the invention.

PARTS LIST 6 digital camera
10 home coputer
12 data bus
14 CPU
16 read-only memory
18 network connection divice
20 hard disk drive
22 random access memory
24 display interface device
26 audio interface device
28 desktop interface device
30 CD-R/W drive
32 floppy disk drive
34 USB interface device
40 foppy disk
42 CD-RW writable media
44 mouse
46 keyboard
48 microphone
50 speaker
52 video display device
60 network
80 graphical bar
82 timeline scale
84 timeline scale
100 block
100A metaohor
102 block
102A timeline metaphor
102B timeline metaphor
104 block
104A year-picture icons
106 block
106B decade-picture icons
108 block
108B year-picture icons
110 block
112 block
114 block
130 block
132 block
134 block
136 block
138 block
142 block
144 block
146 block
148 block
200A timeline metaphor
200B timeline metaphor
200A new timeline
204 icons
206B timeline
208B year-pictures icons
210 block
212 block
214 block
230 block
232 block
234 block
236 block
238 block
240 block
300 timeline metaphor
302 timeline
304 day icons
400 timeline metaphor
402 timeline
404 day icons
500 timeline metaphor
600 timeline location
602 viewable area
604 timeline scale
606 timeline scale
610 pointer
612 display line
614 icons
616 methapor
700 methapor
702 display line
704 icon

The invention claimed is:

1. A method operating a processing unit to process a plurality of visual digital objects, the method comprising the steps of:

using the processing unit to develop a histogram timeline which identifies a number of the visual digital objects said histogram timeline having a first axis with a timeline representing a range of time organized into separate time periods and a second axis orthogonal to the timeline, said second axis representing a number of digital multimedia objects;

wherein each time period on the histogram timeline is associated with a graphical metaphor extending from the first axis in a direction along the second axis to an extent that indicates a relative number of visual digital objects associated with the time period, each said graphical metaphor comprising event icons which group the visual digital objects associated with the time period according to events, said icons being sized to indicate the number of visual digital objects in the group relative to the number of visual digital objects associated with the time period.

2. The method of claim 1, further comprising the steps of receiving a selection of one of the time periods and presenting representations of the visual digital objects associated with the selected time period; and determining if one or more of the viewed representations is of interest.

3. The method of claim 2, further comprising the steps of presenting an output based upon digital visual object(s) that correspond to a representation that is of interest.

4. The method of claim 2, wherein said visual digital object comprises digital multimedia objects the method further comprising the steps of determining if one or more of the viewed representations is of interest and then viewing or processing visual digital object(s) corresponding to the representation.

5. The method of claim 4, wherein at least some of said digital multimedia objects include visual and audio data.

6. The method of claim 1, wherein said event groups are determined by a user inputting the visual digital objects.

7. The method of claim 1, wherein said event groups are determined automatically.

8. The method of claim 1, further comprising the step of receiving a selection of an event group within the metaphor and presenting thumbnail representations of visual digital objects associated with the selected event group.

9. The method of claim 8, further including the step of changing the histogram timeline to vary the earliest to latest dates.

10. The method of claim 8, wherein the representations are provided in a separate viewable area than the histogram timeline and include the thumbnail images and icons of the digital multimedia objects have a displayed date and time of origination.

11. The method of claim 1, further comprising the steps of presenting time based icons associated with each of the predetermined periods of time, receiving a selection of one of the time based icons and presenting a second histogram timeline having a different range of time represented on the first axis said second range of time organized into separate time periods.

12. The method of claim 1, further comprising the steps of presenting an adjustable scroll bar oriented below the representations, receiving an adjustment of the scroll bar and in response to said adjustment adjusting the range of time presented on the first axis of the histogram timeline.

13. The method of claim 1, wherein the histogram timeline is constructed in part by the steps of:
  i) accessing a plurality of visual digital objects stored together or in distributed fashion and forming a database;
  ii) establishing the date of origination of each visual digital object from file header data or object metadata; and
  iii) determining the number of visual digital objects in the database that originated at each date to form the histogram timeline.

14. The method of claim 1, wherein the histogram timeline provides a first axis with the timeline length running from the earliest to the latest dates of the digital multimedia objects in the database and the duration (width) of the histogram timeline bins being responsive to the resolution and size of the display.

15. The method of claim 1, further comprising the steps of receiving a user entered annotation regarding an image, wherein said image is grouped based upon the annotation.

16. A computer storage medium having instructions stored therein for causing a computer to perform the method of claim 1.

17. A method for using a processing unit to generate a viewable histogram timeline based upon a plurality of digital multimedia objects, comprising:

using the processing unit to generate a first axis with a timeline representing a range of time organized into separate time periods and said second axis orthogonal to the timeline axis representing a number of digital multimedia objects; and wherein each time period on the histogram timeline is associated with a graphical metaphor extending from the first axis in a direction along the second axis to an extent that indicates a relative number of visual digital objects associated with the time periods, each said graphical metaphor comprising event icons which group the visual digital objects associated with the selected time period according to events, said icons being proportionately sized to indicate the number of visual digital objects in the group relative to the total number of visual digital objects associated with the time period.

18. The method of claim 17, wherein the timeline is arranged in vertical and horizontal axes so that the horizontal axis is time and the vertical axis is the number of objects, with the timeline length running from the earliest to the latest dates of the objects in a database.

* * * * *